(12) United States Patent
Beach et al.

(10) Patent No.: US 7,653,033 B2
(45) Date of Patent: Jan. 26, 2010

(54) INFRASTRUCTURE FOR WIRELESS LANS

(75) Inventors: Robert Beach, Los Altos, CA (US);
Heiner Schwede, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 829 days.

(21) Appl. No.: 10/784,588

(22) Filed: Feb. 23, 2004

(65) Prior Publication Data

US 2004/0165550 A1  Aug. 26, 2004

Related U.S. Application Data

(63) Continuation of application No. 09/231,625, filed on Jan. 14, 1999, now abandoned.

(51) Int. Cl.
*H04Q 7/24* (2006.01)
*H04L 12/28* (2006.01)

(52) U.S. Cl. ............................. 370/338; 370/389
(58) Field of Classification Search ................. 370/338, 370/389
See application file for complete search history.

(56) References Cited

U.S. PATENT DOCUMENTS

| | | | |
|---|---|---|---|
| 4,519,068 A | | 5/1985 | Krebs et al. |
| 5,046,082 A | | 9/1991 | Zicker et al. |
| 5,239,673 A | | 8/1993 | Natarajan |
| 5,339,316 A | | 8/1994 | Diepstraten |
| 5,371,738 A | | 12/1994 | Moelard et al. |
| 5,406,561 A | * | 4/1995 | Arai ........................... 370/315 |
| 5,432,814 A | | 7/1995 | Hasegawa |
| 5,457,557 A | | 10/1995 | Zarem et al. |
| 5,461,627 A | | 10/1995 | Rypinski |
| 5,465,392 A | | 11/1995 | Baptist et al. |
| 5,490,139 A | * | 2/1996 | Baker et al. .................. 370/312 |
| 5,502,726 A | | 3/1996 | Fischer |
| 5,504,746 A | | 4/1996 | Meier |
| 5,506,887 A | | 4/1996 | Emery et al. |
| 5,533,026 A | * | 7/1996 | Ahmadi et al. ............... 370/349 |
| 5,546,397 A | | 8/1996 | Mahaney |
| 5,602,843 A | | 2/1997 | Gray |
| 5,610,972 A | | 3/1997 | Emery et al. |
| 5,610,973 A | | 3/1997 | Comer |
| 5,623,495 A | | 4/1997 | Eng et al. |
| 5,636,220 A | | 6/1997 | Vook et al. |

(Continued)

FOREIGN PATENT DOCUMENTS

EP    0566874    10/1993

(Continued)

OTHER PUBLICATIONS

Proxim, Inc., White Paper, "What is a Wireless LAN".

(Continued)

*Primary Examiner*—Andrew Lee
(74) *Attorney, Agent, or Firm*—Ingrassia, Fisher & Lorenz, P.C.

(57) ABSTRACT

A wireless data communications system includes simplified access points which are connected to ports of an intelligent switching hub. The switching hub relays data packets to the access points in accordance with destination address data in the data communications. In a preferred arrangement the access points are provided with power over the data cable from the switching hub location.

11 Claims, 7 Drawing Sheets

U.S. PATENT DOCUMENTS

| | | | |
|---|---|---|---|
| 5,668,803 | A | 9/1997 | Tymes et al. |
| 5,717,737 | A | 2/1998 | Doviak et al. |
| 5,724,346 | A * | 3/1998 | Kobayashi et al. .......... 370/329 |
| 5,734,643 | A * | 3/1998 | Rondeau .................... 370/279 |
| 5,734,963 | A | 3/1998 | Fitzgerald et al. |
| 5,737,328 | A | 4/1998 | Norman et al. |
| 5,758,281 | A | 5/1998 | Emery et al. |
| 5,761,619 | A | 6/1998 | Danne et al. |
| 5,765,112 | A | 6/1998 | Fitzgerald et al. |
| 5,768,531 | A | 6/1998 | Lin |
| 5,771,353 | A | 6/1998 | Eggleston et al. |
| 5,796,729 | A | 8/1998 | Greaney et al. |
| 5,835,696 | A | 11/1998 | Hess |
| 5,850,526 | A | 12/1998 | Chou |
| 5,852,405 | A | 12/1998 | Yoneda et al. |
| 5,870,385 | A | 2/1999 | Ahmadi et al. |
| 5,873,085 | A | 2/1999 | Enoki et al. |
| 5,875,186 | A | 2/1999 | Belanger et al. |
| 5,881,094 | A | 3/1999 | Schilling |
| 5,889,816 | A | 3/1999 | Agrawal et al. |
| 5,898,679 | A * | 4/1999 | Brederveld et al. ......... 370/315 |
| 5,901,362 | A | 5/1999 | Cheung et al. |
| 5,907,544 | A | 5/1999 | Rypinski |
| 5,912,885 | A | 6/1999 | Mitts et al. |
| 5,918,181 | A | 6/1999 | Foster et al. |
| 5,926,463 | A | 7/1999 | Ahearn et al. |
| 5,946,617 | A | 8/1999 | Portaro et al. |
| 5,958,006 | A | 9/1999 | Eggleston et al. |
| 5,960,344 | A | 9/1999 | Mahany |
| 5,964,815 | A * | 10/1999 | Wallace et al. ................ 701/45 |
| 5,974,034 | A | 10/1999 | Chin et al. |
| 5,987,521 | A * | 11/1999 | Arrowood et al. .......... 709/239 |
| 5,991,287 | A | 11/1999 | Diepstraten et al. |
| 5,999,295 | A | 12/1999 | Vowell et al. |
| 6,005,884 | A | 12/1999 | Cook et al. |
| 6,006,090 | A | 12/1999 | Coleman et al. |
| 6,011,975 | A | 1/2000 | Emery et al. |
| H1836 | H | 2/2000 | Fletcher et al. |
| 6,029,064 | A | 2/2000 | Farris et al. |
| 6,031,863 | A | 2/2000 | Jusa et al. |
| 6,064,887 | A | 5/2000 | Kallioniemi et al. |
| 6,067,291 | A | 5/2000 | Kamerman et al. |
| 6,088,346 | A | 7/2000 | Du et al. |
| 6,101,531 | A | 8/2000 | Eggleston et al. |
| 6,119,162 | A | 9/2000 | Li et al. |
| 6,137,797 | A | 10/2000 | Bass et al. |
| 6,140,911 | A | 10/2000 | Fisher et al. |
| 6,154,461 | A | 11/2000 | Sturniolo et al. |
| 6,205,495 | B1 | 3/2001 | Gilbert et al. |
| 6,213,942 | B1 | 4/2001 | Flach et al. |
| 6,259,898 | B1 | 7/2001 | Lewis |
| 6,272,120 | B1 | 8/2001 | Alexander |
| 6,301,618 | B1 | 10/2001 | Sitaraman et al. |
| 6,330,231 | B1 | 12/2001 | Bi |
| 6,330,244 | B1 | 12/2001 | Swartz et al. |
| 6,353,599 | B1 | 3/2002 | Bi et al. |
| 6,359,873 | B1 | 3/2002 | Kobayashi |
| 6,393,261 | B1 | 5/2002 | Lewis |
| 6,400,722 | B1 | 6/2002 | Chuah et al. |
| 6,414,950 | B1 | 7/2002 | Rai et al. |
| 6,415,323 | B1 | 7/2002 | McCanne et al. |
| 6,421,714 | B1 | 7/2002 | Rai et al. |
| 6,473,449 | B1 | 10/2002 | Cafarella et al. |
| 6,487,605 | B1 | 11/2002 | Leung |
| 6,496,499 | B1 | 12/2002 | Hamilton et al. |
| 6,496,881 | B1 | 12/2002 | Green |
| 6,512,754 | B2 | 1/2003 | Feder et al. |
| 6,590,884 | B1 | 7/2003 | Panasik |
| 6,590,885 | B1 | 7/2003 | Jorgensen |
| 6,629,151 | B1 | 9/2003 | Bahl |
| 6,665,536 | B1 | 12/2003 | Mahaney |
| 6,681,259 | B1 | 1/2004 | Lemilainen et al. |
| 6,701,361 | B1 | 3/2004 | Meier |
| 6,714,987 | B1 | 3/2004 | Amin et al. |
| 6,717,926 | B1 | 4/2004 | Deboille et al. |
| 6,724,730 | B1 | 4/2004 | Mlinarsky et al. |
| 6,751,250 | B2 | 6/2004 | Kirke et al. |
| 6,760,859 | B1 | 7/2004 | Kim et al. |
| 6,901,259 | B2 | 5/2005 | Dorenbosch |
| 6,947,408 | B1 | 9/2005 | Liberti et al. |
| 7,149,193 | B2 | 12/2006 | Fong et al. |
| 7,173,922 | B2 | 2/2007 | Beach |
| 2001/0055283 | A1 | 12/2001 | Beach |
| 2002/0015398 | A1 | 2/2002 | Kikinis |
| 2002/0034168 | A1 | 3/2002 | Swartz et al. |
| 2002/0089958 | A1 | 7/2002 | Feder et al. |
| 2002/0097560 | A1 | 7/2002 | Carr |
| 2002/0099972 | A1 | 7/2002 | Walsh et al. |
| 2002/0181429 | A1 | 12/2002 | Kikinis |
| 2002/0196763 | A1 | 12/2002 | Reynolds et al. |
| 2002/0197984 | A1 | 12/2002 | Monin et al. |
| 2003/0012164 | A1 | 1/2003 | Mizoguchi et al. |
| 2003/0101131 | A1 | 5/2003 | Warren et al. |
| 2003/0105865 | A1 | 6/2003 | McCanne et al. |
| 2003/0112820 | A1 | 6/2003 | Beach |
| 2003/0193946 | A1 | 10/2003 | Gernert et al. |
| 2004/0022222 | A1 | 2/2004 | Clisham |
| 2004/0029612 | A1 | 2/2004 | Gorsuch |
| 2004/0110506 | A1 | 6/2004 | Dent |
| 2004/0152482 | A1 | 8/2004 | Raffel et al. |
| 2004/0165550 | A1 | 8/2004 | Beach et al. |
| 2005/0028032 | A1 | 2/2005 | Klein |
| 2005/0058087 | A1 | 3/2005 | Beach |
| 2005/0157690 | A1 | 7/2005 | Frank et al. |
| 2005/0226181 | A1 | 10/2005 | Beach |
| 2006/0190586 | A1 | 8/2006 | Stewart et al. |
| 2007/0038759 | A1 | 2/2007 | Hanson et al. |

FOREIGN PATENT DOCUMENTS

| | | |
|---|---|---|
| EP | 0696117 | 2/1996 |
| EP | 0817096 | 1/1998 |
| EP | 1134935 | 9/2001 |
| GB | 2 320 647 | 6/1998 |
| JP | H5336127 | 12/1993 |
| JP | H964901 | 3/1997 |
| JP | H964901 | 7/1997 |
| WO | WO 93/07684 | 4/1993 |
| WO | 93/15572 A1 | 8/1993 |
| WO | WO 95/05720 | 2/1995 |
| WO | WO 96/23377 | 1/1996 |
| WO | 96/04734 A1 | 2/1996 |
| WO | WO 97/21316 | 6/1997 |
| WO | WO 97/29602 | 8/1997 |
| WO | 97/41650 A1 | 11/1997 |
| WO | 9937047 | 7/1999 |
| WO | 00/24216 A2 | 4/2000 |
| WO | 0024216 | 4/2000 |
| WO | 00/68824 A1 | 11/2000 |
| WO | WO 01/43467 | 6/2001 |
| WO | WO 2004/107174 | 12/2004 |
| WO | WO 2004/107638 | 12/2004 |

OTHER PUBLICATIONS

Shankaranarayanan N K et al. "Multiport Wireless Acess System Using Fiber/Coax Networks for Personal Communications Services (PCS) and Subscriber Loop Applications," Global Telecommunications Conference 1995. Conference Record. Communication Theory Mini-Conference, Globecom '95., IEEE Singapore Nov. 13-17, 1995, New York, New York, USA, IEEE, US, Nov. 13, 1995, pp. 977-981, XP010164519.

Rypinski, Chandos "Motivation for Centralized LAN Functions," Personal, Indoor and Mobile Radio Communications, 1992. Proceedings, PIMRC '92, Third IEEE International Symposium on Boston, MA, USA, Oct. 19-21, 1992, New York, NY, USA, IEEE, US, Oct. 19, 1992, pp. 153-158, ISBN: 0-7803-0841-7.

Navarro, A. et al. "A Simple TMS320C31 DSP—PC Bus Interface Circuit," Electrotechnical Conference, 1998. MELECON 98., 9th Mediterranean, May 1998, vol. 1, pp. 530-533.

Maguire, G. et al. "A Multiport Mobile Internet-Router," IEEE 44th Vehicular Technology Conference, Jun. 1994, vol. 3, pp. 1435-1439.

Hecht, Jeff; Understanding Fiber Optics; 489 Pages; Second Edition; Prentice Hall, Inc., Upper Saddle River, NJ 1993.

Information Technology—Telecommunications Exchange Between Systems—Local and Metropolitan Area NetwEAks, Specific Rquirements: Part II: Wireless LAN Medium Access Control (MAC) and Physical Layer (PHY) Specifications; 528 pages; 1999 Edition; LAN MAN Standards Committe of the IEEE Computer Society; ANSI/IEEE Std 802.11; Piscataway, NJ, reaffirmed 2003.

* cited by examiner

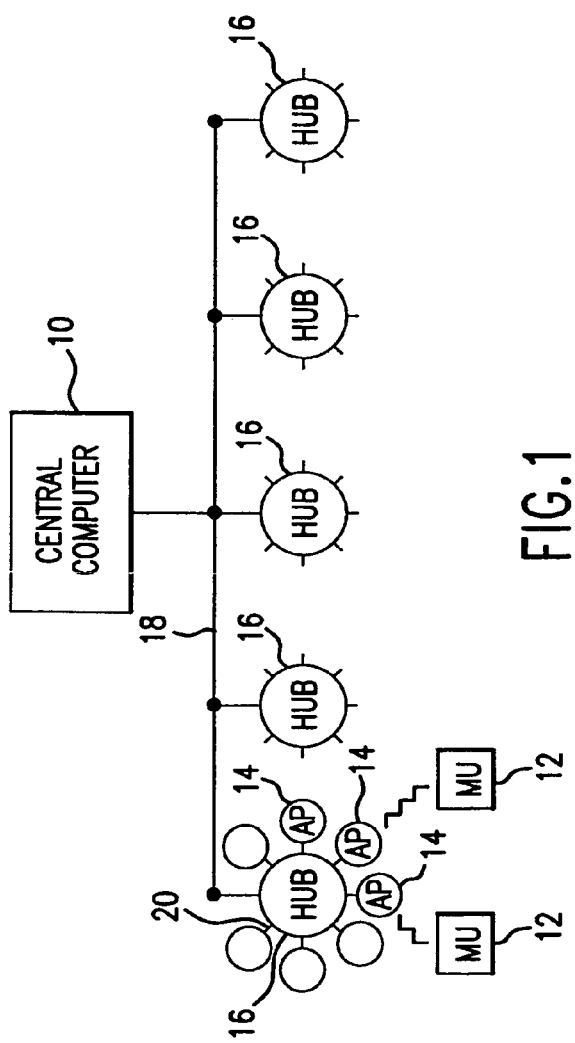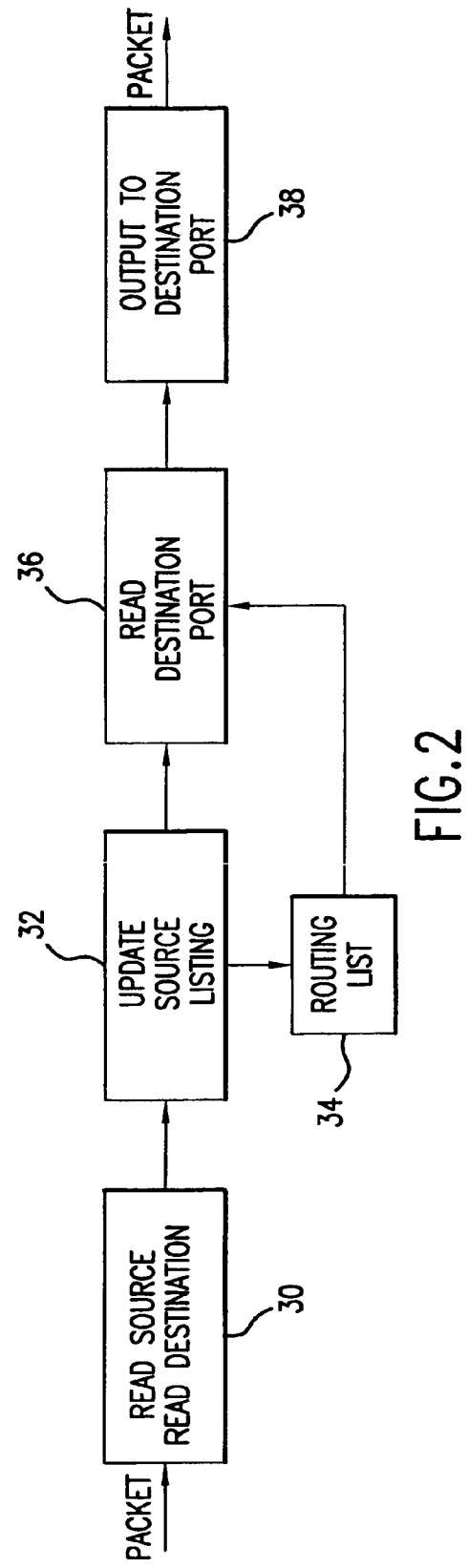

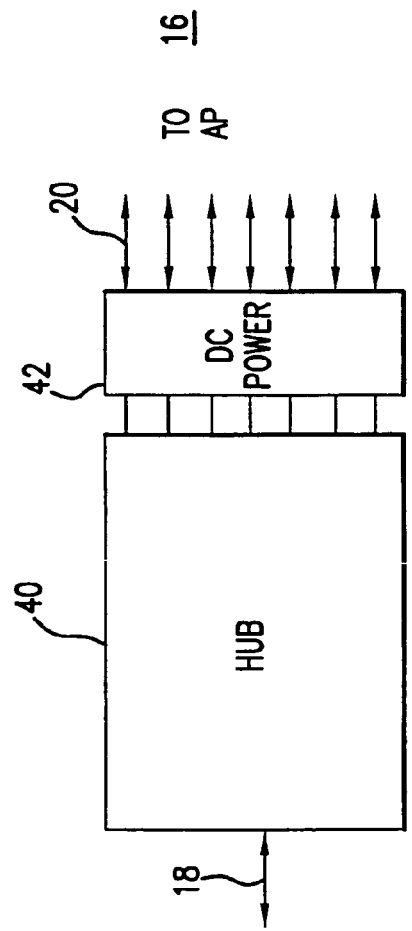
FIG.7
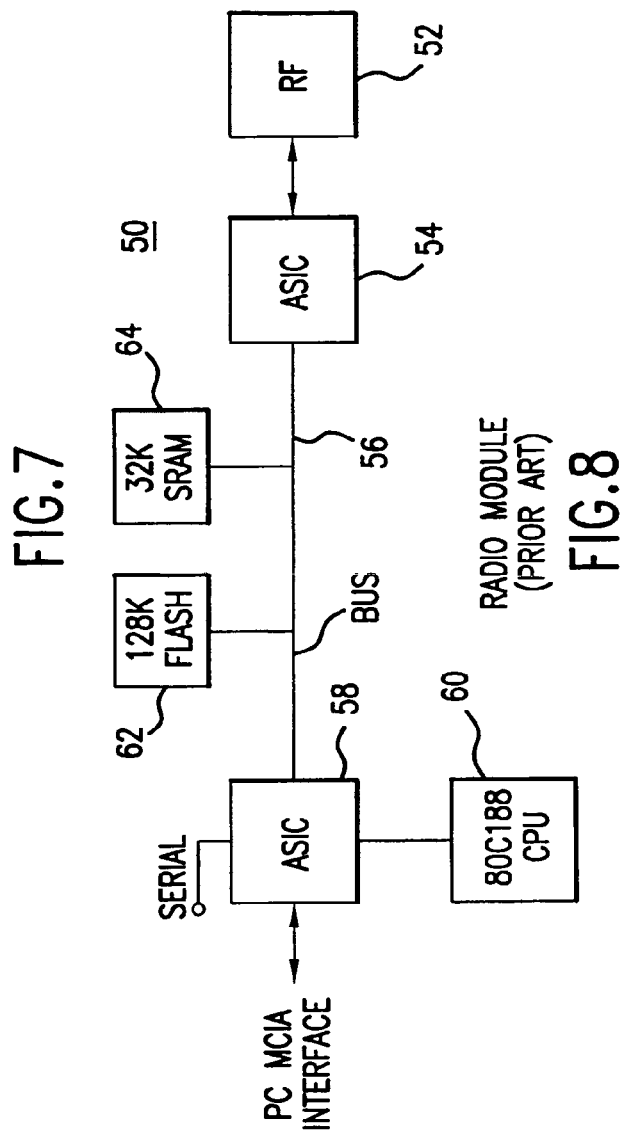
FIG.8 RADIO MODULE (PRIOR ART)

INFRASTRUCTURE FOR WIRELESS LANS

CROSS-REFERENCE TO RELATED APPLICATIONS

This application is a continuation of application Ser. No. 09/213,625, filed Jan. 14, 1999 now abandoned.

BACKGROUND OF INVENTION

This invention relates to wireless data communications networks, and in particular to arrangements for communications between mobile data handling units and a central computer using such networks.

The assignee of the present invention supplies a wireless data communications systems known as the Spectrum 24® System, which follows the communications protocol of IEEE Standard 802.11. In the system as implemented, mobile units are in data communication with a central computer through access points. The access points communicate with the computer over an Ethernet wired network. Each of the mobile units associates itself with one of the access points. In order to maintain order and reduce radio communications each access point must determine which of the communications received over the Ethernet link from the central computer is destined for a mobile unit associated with that particular access point. This requirement adds significant computational capacity to the access point, increasing the cost thereof.

In addition, in applications that must support a high volume of data communications from multiple users, such as systems supporting a self-service shopping system, hospital systems, systems that include paging or voice data links to many users, or systems supporting communicating with electronic shelf labels, additional access points are required to support the data communications traffic, increasing the overall system cost.

The cost of an operational access point is dependent not only on the complexity thereof and the requirement for high speed processing of data pockets for purposes of selecting those destined for mobile units associated with an access point, but the additional cost of the installation of electrical power to the location of the access point, and the cost of a power supply to convert AC electrical power to DC power for the circuits of the access point. Further cost may be involved in physically mounting the access point hardware and antenna.

It is therefore an object of the present invention to provide an improved wireless data communications network with lower cost access points, to enable the economical provision of reliable wireless data communications with increased capacity and in complex installations at reasonable cost.

SUMMARY OF THE INVENTION

In accordance with the invention there is provided an improvement in a wireless data communications system wherein data communications are provided between mobile units and a central computer by access points. In accordance with the improvement, some of the access points are connected to said computer through at least one data switching hub, and said data switching hub is arranged to selectively provide data communications to the access points connected to the hub in accordance with destination address data in the communications. The data switching hub may also be arranged to monitor source address data in communications received from each access point connected to a port of the data switching hub. The switching hub can be arranged to maintain a routing list correlating the source address data with the port. The switching hub is arranged to use the list to selectively provide the data communications to the access points.

In accordance with the invention there is provided an access point for use in a wireless data communications system wherein access points in radio data communication with mobile units are connected to at least one data switching hub for selectively providing data communications to the access points. A transmitter/receiver provides the radio data communication with the mobile units. A data interface is provided for data communications with the switching hub over a cable. A processor is provided for coupling data between the data interface and the transmitter receiver and a power supply is provided for receiving operating power from the cable and to provide power to the interface, the processor and the transmitter/receiver.

In accordance with the invention there is provided a method for providing data communications between mobile units and a central computer. The method includes the steps of connecting the central computer to at least one switching hub over a wire data communication network and connecting a plurality of access points to ports of the switching hub. Mobile units associate themselves with selected ones of the access points. Data communication packets are provided on the wired communication network which include destination addresses. The switching hubs maintain a routing list relating ports to the access points and the mobile units associated with the access points. The switching hub is operated to relay data communication packets from the wired data communications network to the access points in accordance with the routing lists. Data communications received from the switching hub by the access points are sent to the associated mobile units by radio communications.

In a further arrangement of the method data communications are provided from one of the mobile units by radio communications to an associated access point, the packets including a destination address and a source address corresponding to the mobile unit. The access points relay the data communications packets to a port on the switching hub, and the switching hub is operated to relay the data communications packets received from the access points to the wired data communication network or to other access points in accordance with the destination address. The switching hub also updates the routing list at the switching hub by relating the port of the switching hub to the source address of the data packet.

In accordance with the invention there is provided a data communications system which provides data communications between at least one computer and a plurality of mobile units. The system includes a plurality of access points, each arranged for provided radio data communications and having a wired data interface. There is also provided a plurality of mobile units, each arranged to associate itself with one of the access points and conduct radio data communications therewith. There is provided at least one switching hub having a first wired data port and a plurality of additional wired data ports, each connected to the wired data interface of one of the access ports. There is finally provided a wired data communication network for providing wired data communications between at least one computer and the first wired port of the switching hub.

In such a data communications system, wherein data is communicated over the wired data communication network as data packets, each having a destination address data, the switching hub is arranged to examine the destination address data and provide the data packets to one of the additional wired ports if the destination address data corresponds to an address on a routing list associated with the additional wired port. In a preferred embodiment, data is communicated from the access points over the wired data interface as data packets to one of the additional wired data ports of the switching hub. The data packets include source address data and the switching hub is arranged to examine the source address data and to associate the corresponding source address data with both the additional port on the routing list. In a preferred arrangement the access points are connected to the data ports of the switching hub over multi-conductor cables and the cables can be arranged to provide power to the access points. The power may be provided using a power supply module adjacent to switching hub. Alternatively, the power supply module may be housed inside the switching hub.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 is a block diagram of a wireless communications system in accordance with the present invention.

FIG. 2 is a flow diagram illustrating the processing in a hub of the FIG. 1 system.

FIG. 7 is a block diagram showing supply of power to access point cables.

FIG. 8 is a block diagram showing a radio module according to the prior art used with the access point of FIG. 3.

DESCRIPTION OF THE INVENTION

Figure 3:
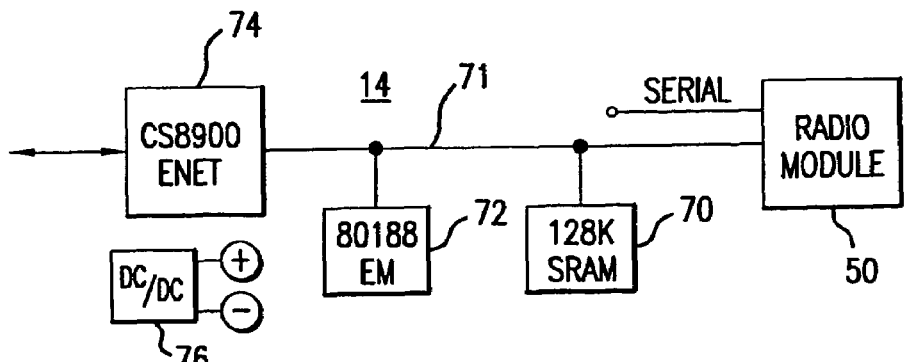
FIG. 3 is a block diagram illustrating one embodiment of an access point useable in the FIG. 1 system.

Referring to FIG. 1, there is shown a wireless data communications systems according to the present invention for providing data communications between a central computer 10 and a plurality of mobile units 12. The system uses access points 14 to provide radio packet communications with the mobile units 12 using the frequency hop spread spectrum communications protocol of IEEE Standard 802.11, whereby the radio modules in the mobile units 12 monitor polling signals from the access points 14 and associate with an access point for purposes of data communications. The radio modules of the mobile units and access points may, for example, be identical to those used in the Spectrum 24® system.

In prior systems each access point is connected on an Ethernet wired network to the central computer. The access points are required to determine the identity of mobile units which have become associated with them and to extract from the data packets on the network those packets addressed to a mobile unit associated with the access point. This requirement has led to significant processing burden for the access points and led to increased cost for the access points.

In the system of FIG. 1, the central computer 10 communicates over an Ethernet wired network 18 with intelligent switching hubs 16. Alternately a Token ring network can be used. Switching hubs 16 determine the destination of each packet and route packets to access points 14 if the destination of the packet is a mobile unit 12 associated with the access point 14. To achieve this function, the hub is an intelligent hub which maintains a routing list of mobile units 12 and their associated access point 14 according to the port of each hub. These lists are generated using the packet handling process of FIG. 2, wherein at step 30 the hub processor reads the packet source address data and packet destination address data of each packet received on one of its ports. The source address data is used at step 32 to update a routing list 34 which identifies a hub port with a data source address. The destination address data of the packet is used at step 36 to determine which port to route the packet to, according to the port associated with that address in routing list 34. At step 38 the packet is routed to the appropriate port.

In practice, the hub need only maintain a source list 34 for those access points 14 connected to the hub 16 and mobile units associated with access points 14 connected to the hub 16. Thus, if a packet is received at a hub over the Ethernet 18 with a destination address which is not associated with that hub, the source address need not be maintained on list 34. The hub will route the packet to an access point only if the destination address of the packet is identified on list 34, otherwise the packet is ignored. When a packet is received on a hub port associated with a communications line 20 connected to an access point, the source address is associated with the hub port in list 34. The packet is routed either to the Ethernet connection 18 or to another port according to the destination address.

Advantageously, in order to update the list maintained by hub 16, upon initial association of a mobile unit with an access point, either the mobile unit or the newly associated access point provides a message packet, such as a broadcast message to the hub 16, with the source address of the message corresponding to the mobile unit. Upon receiving this message, the hub update its list to include the association of the mobile unit with the port at which the access point is connected.

By determining destination address in hub 16 and maintaining the association of a mobile unit 12 with an access point 14 connected to a port of hub 16 in routing list 34 of hub 16, the functionality required of the access points is greatly reduced. The access point acts merely as a conduit sending RF transmissions of packets received on communication line 20, and receiving transmission from associated mobile units 12 and providing Ethernet packets to hub 16. In addition, the access point 14 must provide mobile unit association functions as provided in the Spectrum 24® system and may also provide proxy polling responses for associated mobile units 12 that are in power saving mode.

While the access point 14 routinely functions as a conduit of communication to its associated mobile units, some limited selection of data packets is possible. In particular, for example, the access point 14 may be arranged not to relay certain types of broadcast messages, such as router broadcast messages, that are not required to be received by the mobile units. In another arrangement, multiple access points may be connected in parallel to a single hub, in which case the access points can be arranged to not relay messages directed at mobile units associated with other access points.

FIG. 8 is a block diagram of a radio module 50 for use in the Spectrum 24® system. The module includes components, including a microprocessor and program, for carrying out frequency-hop, spread-spectrum communications utilizing the IEEE Standard 802.11 in the 2.4 GHz. frequency band. Radio module 50 includes 80C188 processor 60, operating under the Galaxy firmware from Symbol Technologies and associated with the interface protocol of the Spectrum 24® system. Firmware is stored in flash memory 62, and SRAM 64 provides processing memory and data buffer functions. Interface 58 may be an S24 DRVP low-level polled interface module.

Utilizing radio module 50 as a unit, a simplified access point configuration is shown in FIG. 3. Radio module 50 is connected via its PCMCIA interface 58 to data bus 71, which is also connected to processor 72, SRAM 70 and to Ethernet interface module 74, comprising a CS 8900 Ethernet controller available from Cirrus. Firmware for processor 72 may be provided on memory 62 coupled to bus 56, or alternately may be booted from flash memory 62 to SRAM 70. Processor 72 operates with Ethernet controller 74 as part of its memory space accessible through DMA to transfer messages between Ethernet controller 74 and radio module 50 via buffer 70.

Figure 5:
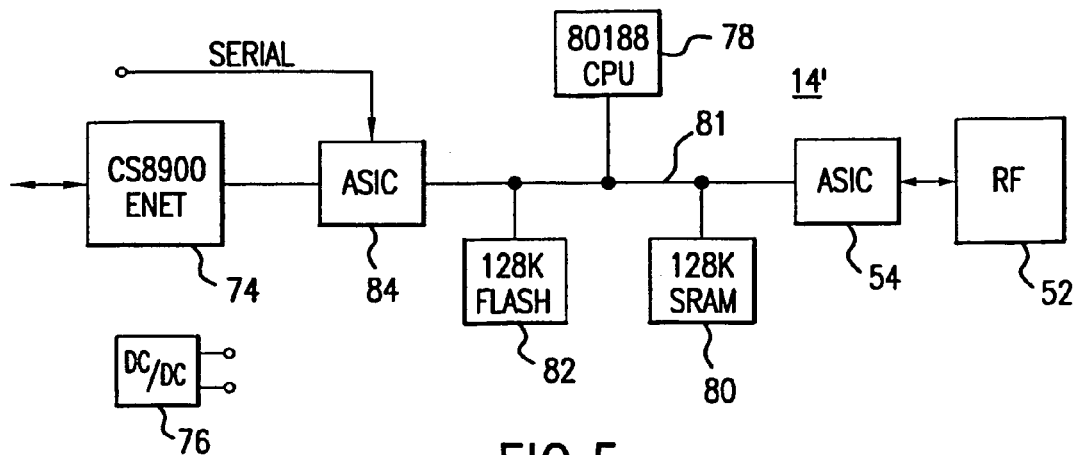
FIG. 5 is a block diagram of an alternate embodiment of an access point usable in the FIG. 1 system.

An alternate arrangement is shown in FIG. 5. In the access point 14' of FIG. 5, the components of radio module 50 are modified to provided direct interface via ASIC 84 to Ethernet controller 74 via a DMA channel in interface 84. The radio module and interface transfer are handled by CPU 78, which is provided with combined firmware on flash memory 82 and using an enlarged SRAM 80.

Figure 9:
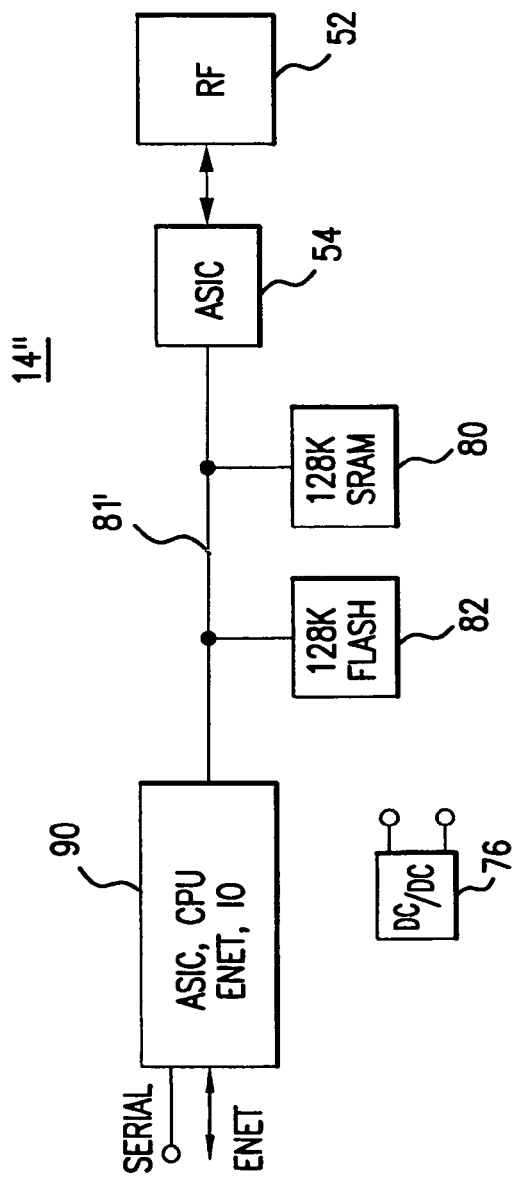
FIG. 9 is a block diagram showing a further alternate embodiment of an access point usable in the FIG. 1 system.

Still another alternate arrangement is shown as access point 14", in FIG. 9. In access point 14", the CPU, ASIC, and Ethernet controller functions are provided by CPU 90, so that only a single processor is required.

In accordance with a further feature of the present invention, the simplified access points 14, 14' and 14" are provided with power over the Ethernet cabling. In particular, the Ethernet data communication with the access points are carried on two of the four wire pairs on the Ethernet cable 20. The remaining two pairs of cable 20 are used to supply dc power to the access points. Referring to FIG. 7, hub 16 includes an intelligent switching hub 40 of standard design having an Ethernet port to cable 18 and, for example, seven additional Ethernet ports to cables 20 for connection to access points 14. D.C. power module 42 is connected between the access point ports of hub 40 and cables 20 to provide D.C. power, e.g. 12 to 50 V.D.C. to the extra wire pairs of cables 20. The D.C. power module may be incorporated internally to the hub.

Each access point includes a DC-DC power supply 76 for converting the DC voltage from cable 20 to an appropriate level, e.g. 5 volts, to operate the logic and radio circuits of the access point.

Figure 10:
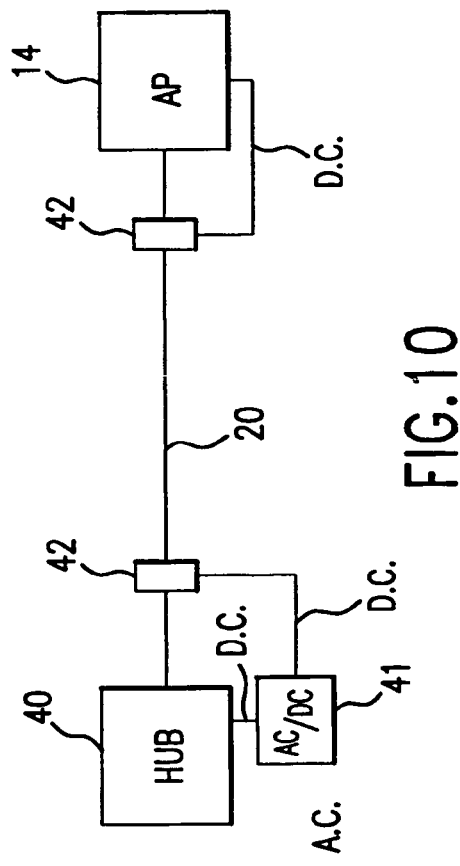
FIG. 10 is a block diagram showing one arrangement for providing d.c. power to an access point.
Figure 13:
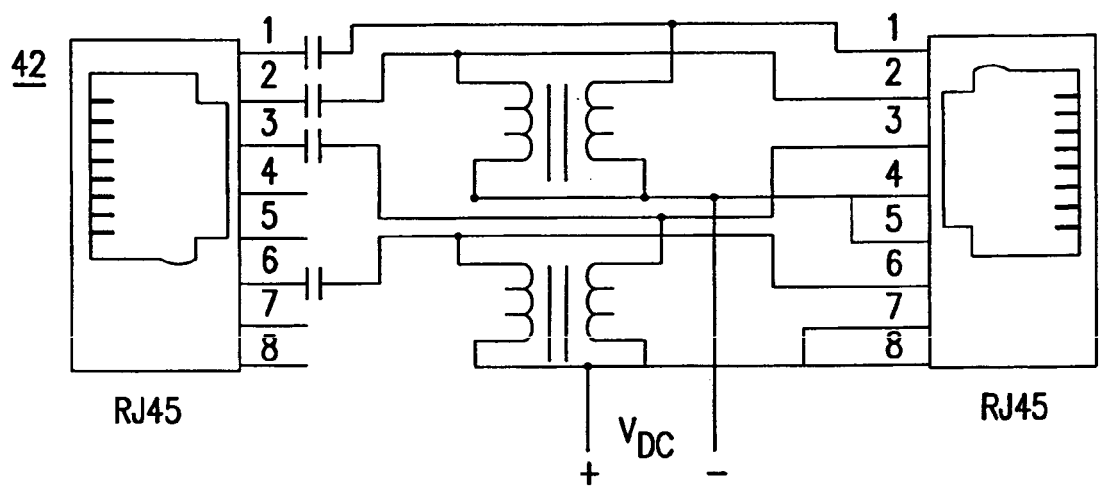
FIG. 13 is a circuit diagram of choke circuit useful in practicing the present invention.

Another arrangement for providing power to the access point is shown in FIG. 10. Choke circuits 42 are interposed in cable 20 from switching hub 40 to access point 14. D.C. power from a power supply 41, which may also serve hub 40, is coupled to cable 20 using, for example, the choke circuit 42, shown in FIG. 13, which is available from Pulse of San Diego, Calif., Model P0421. Using this circuit the D.C. power is carried on all lines of cable 20. Capacitors in circuit 42 isolate the D.C. source from the data ports at hub 40 and access point 14, while the inductive circuits prevent the power supply from loading the high frequency data signals.

Figure 11:
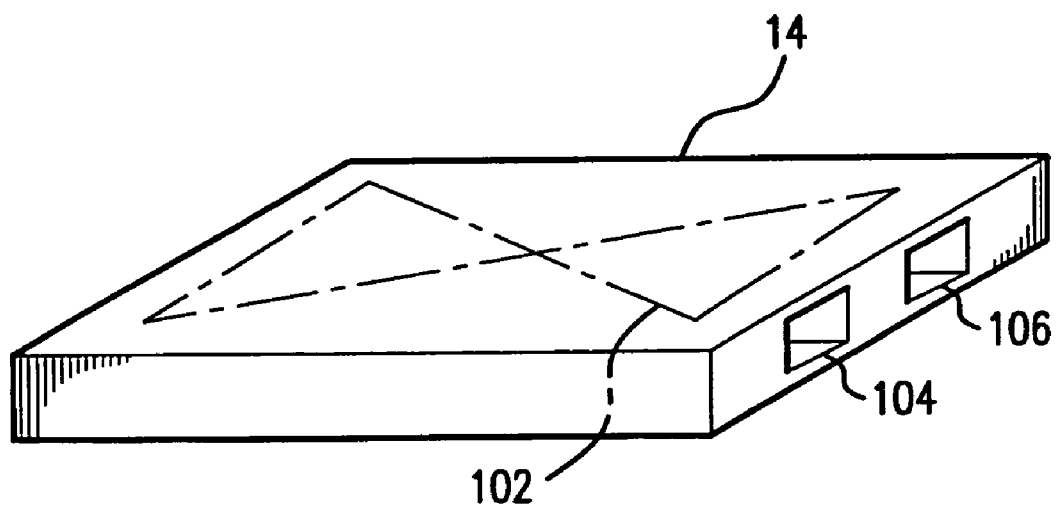
FIG. 11 is a perspective view of an access pointy enclosure according to one embodiment of the invention.

Using the features of the present invention, the cost, complexity and size of the access point is reduced significantly. The access point requires no connection to primary power and is connected only by the Ethernet cable 20 to the hub 16. In addition, a simple antenna 102 may be mounted within, or directly on the module as shown in FIG. 11 to provide a simple package, about the size of a portable tape player, that can be easily mounted on a wall or ceiling, possibly using Velcro or adhesive attachment. The access point may include a pair of cable sockets 104, 106 to accommodate a cable to the hub 16, and possibly an extension cable to accommodate an additional access point or other device connected to the same port of hub 16. Sockets 104 and 106 are wired in parallel.

Figure 12:
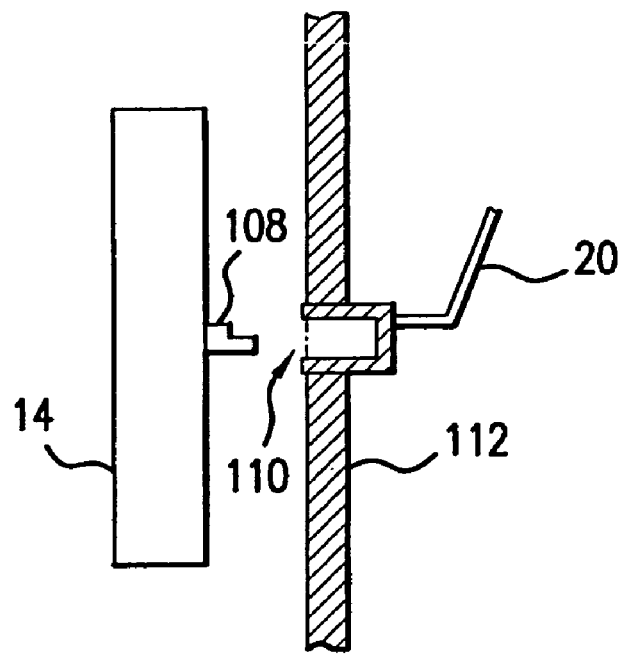
FIG. 12 is a side view of an alternate embodiment of an access point enclosure.

In another arrangement, access point 14 may be provided with a connector jack 108, which is received in a socket 110 on a wall or surface mounted unit 112, as shown in FIG. 12.

Figure 4:
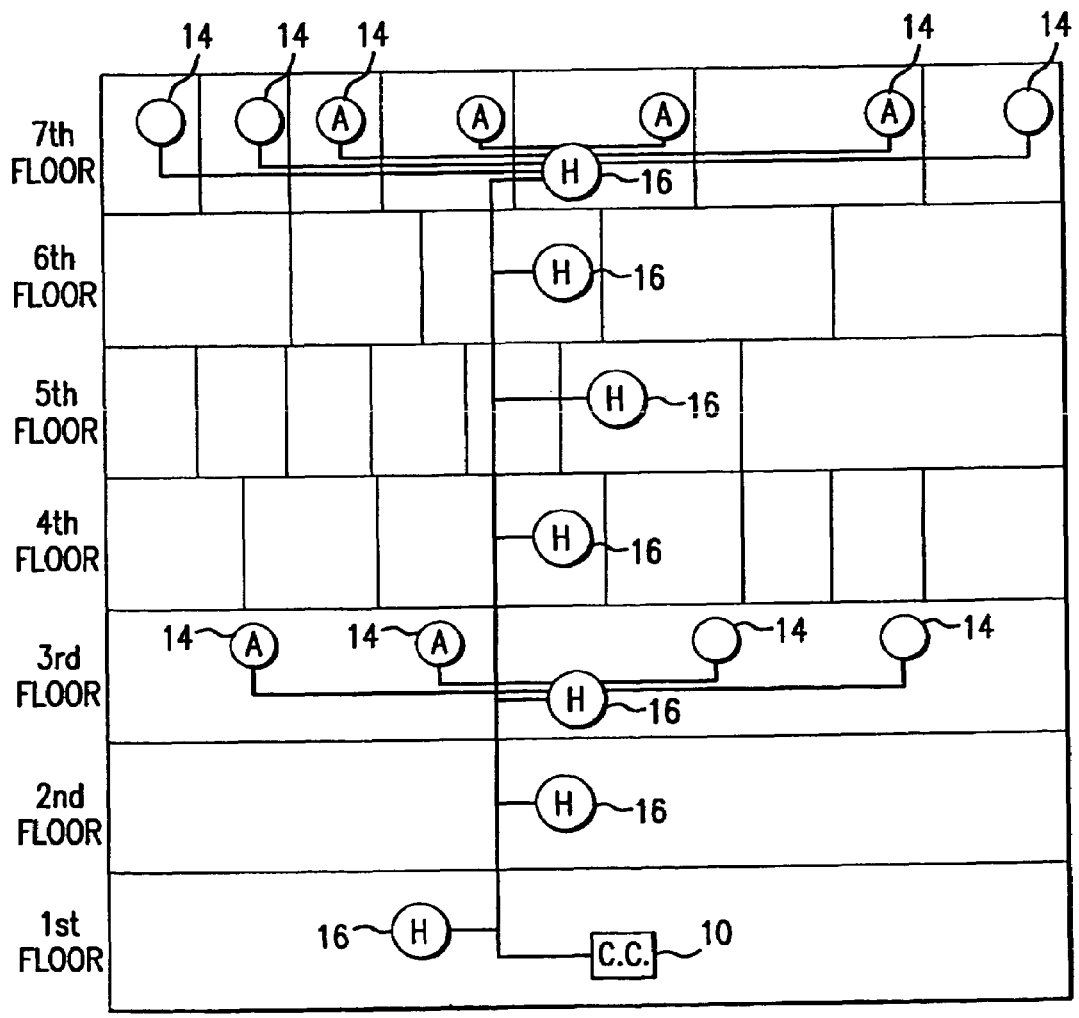
FIG. 4 is a cross-sectional view of a building showing the use of the FIG. 1 system.
Figure 6:
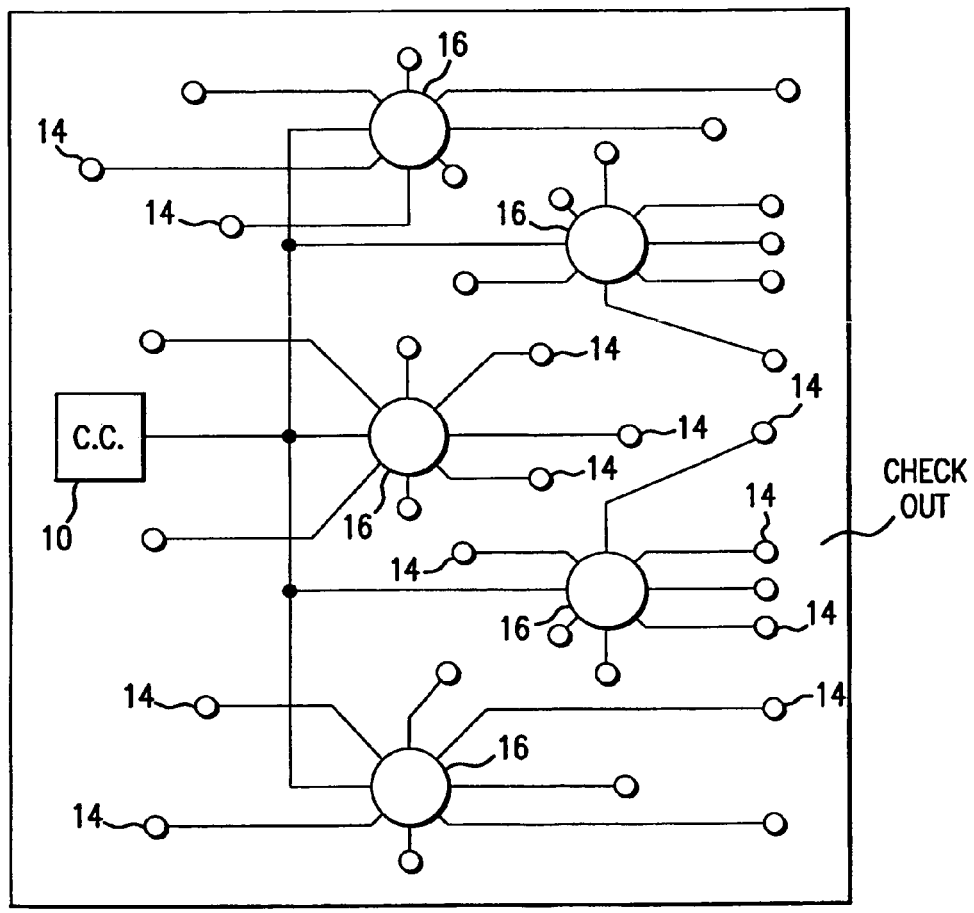
FIG. 6 is a top view of a building showing the use of the FIG. 1 system.

FIGS. 4 and 6 show examples of how the system of the present invention can be advantageously used to provide extensive access point installation in facilities. FIG. 4 shows installation in a multi-storied building, such as an office building or hospital, wherein access points 14 can be installed economically in many rooms on a floor and connected to a hub 16 on each floor. Improved coverage and improved capacity can be provided.

FIG. 6 shows installation in a large store, e.g. a store using a self service shopping system with radio data communications using portable terminals or electronic shelf labels with wireless communication. Access points can be provided at many locations throughout the store to avoid dead zones, and additional access points can be provided near the check-out stations to handle the possibility of greater usage demand in that area.

While there have been described what are believed to be the preferred embodiments of the present invention, those skilled in the art will recognize that other changes and modifications may be made thereto without departing from the spirit of the present invention, and it is intended to claim all such changes and modifications as fall within the true scope of the invention.

The invention claimed is:

1. A wireless Local Area Network system comprising:
   a wireless communication server; and
   one or more access points operably connected to the wireless communication server, the access points adapted to wirelessly transmit and receive data to and from remote units using a radio frequency communications such that the remote units form part of a wireless Local Area Network providing functionality in accordance with a wireless communication standard protocol, wherein the wireless communication server provides the functionality of the wireless communication standard protocol that performs centralized filtering and forwarding of data to be transmitted to the remote units, wherein the data comprises a packet including a packet source address and packet destination address;
   wherein the wireless communication server includes at least one destination table relating remote units to access points with which said remote units are associated, wherein the destination table is used in conjunction with the packet destination address to forward the data to the remote units.

2. The wireless Local Area Network system of claim 1 wherein the wireless communication server is connected through conventional network elements to the access points.

3. The wireless Local Area Network system of claim 1 wherein the wireless communication server and the one or more access points are connected to an existing wired network.

4. The wireless Local Area Network system of claim 3 wherein the existing wired network is an Ethernet network.

5. The wireless Local Area Network system of claim 1 wherein the wireless communication server is connected to the one or more access points through a direct cable connection.

6. The wireless Local Area Network system of claim 1 further comprising at least one additional wireless communication server.

7. The wireless Local Area Network system of claim 6, wherein said at least one additional wireless communication server provides serves for additional access points.

8. The wireless Local Area Network system of claim 1, wherein the access points transmit the radio frequency wireless signals using an unlicensed frequency band.

9. The wireless Local Area Network system of claim 1, wherein the system provides automatic association of the access points and the wireless communication server.

10. The wireless Local Area Network system of claim 1, wherein the wireless communication server filters network data based on a remote unit identification.

11. The wireless Local Area Network system of claim 1, wherein the wireless communication standard protocol is an Institute for Electrical and Electronics Engineers (IEEE) 802.11 standard protocol.

* * * * *

UNITED STATES PATENT AND TRADEMARK OFFICE
CERTIFICATE OF CORRECTION

PATENT NO. : 7,653,033 B2
APPLICATION NO. : 10/784588
DATED : January 26, 2010
INVENTOR(S) : Beach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1177 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,033 B2 | Page 1 of 1 |
| APPLICATION NO. | : 10/784588 | |
| DATED | : January 26, 2010 | |
| INVENTOR(S) | : Beach et al. | |

It is certified that error appears in the above-identified patent and that said Letters Patent is hereby corrected as shown below:

ON THE TITLE PAGE

1. On the Title Page, in Field (63), under "Related U.S. Application Data", in Column 1, Line 2, delete "abandoned." and insert -- abandoned, which Claims Priority from Provisional Application 60/071,302 filed on January 16, 1998. --, therefor.

2. Title Page 2, in Field (56), under "OTHER PUBLICATIONS", in Column 2, Line 6, delete "New York, New York," and insert -- New York, --, therefor.

3. Title Page 3, in Field (56), under "OTHER PUBLICATIONS", in Column 1, Line 4, delete "NY, USA, IEEE, US," and insert -- USA, IEEE, --, therefor.

IN THE SPECIFICATION

4. In Column 3, Line 50, delete "DESCRIPTION" and insert -- DETAILED DESCRIPTION --, therefor.

5. In Column 5, Line 18, delete "CS 8900" and insert -- CS8900 --, therefor.

IN THE CLAIMS

6. In Column 7, Line 10, in Claim 7, delete "serves" and insert -- services --, therefor.

Signed and Sealed this
Eighth Day of November, 2011

David J. Kappos
*Director of the United States Patent and Trademark Office*